(12) United States Patent
Bradford et al.

(10) Patent No.: US 9,587,534 B2
(45) Date of Patent: Mar. 7, 2017

(54) OIL PAN WITH INTEGRATED CAPACITIVE SENSOR FOR MEASURING OIL LEVEL

(71) Applicant: FLEXTRONICS AP, LLC, San Jose, CA (US)

(72) Inventors: Curtis Vance Bradford, Los Gatos, CA (US); Brian Wayne Holmes, Ottawa (CA); Rajagopalan Dhesikan, San Jose, CA (US); Mei Ho Stinson, Fremont, CA (US); Dung Dang Huynh, Campbell, CA (US); Jose Luis Tenorio Correa, Milpitas, CA (US); Shaily Deva, Saratoga, CA (US); John Nashed Hanna, Austin, TX (US)

(73) Assignee: Flextronics AP, LLC, San Jose, CA (US)

( * ) Notice: Subject to any disclaimer, the term of this patent is extended or adjusted under 35 U.S.C. 154(b) by 0 days.

(21) Appl. No.: 14/946,441

(22) Filed: Nov. 19, 2015

(65) Prior Publication Data
US 2016/0230625 A1    Aug. 11, 2016

Related U.S. Application Data

(60) Provisional application No. 62/114,857, filed on Feb. 11, 2015.

(51) Int. Cl.
*G06F 17/10* (2006.01)
*F01M 11/12* (2006.01)
(Continued)

(52) U.S. Cl.
CPC ......... *F01M 11/12* (2013.01); *F01M 11/0004* (2013.01); *G01F 23/265* (2013.01); *G01F 23/268* (2013.01); *G07C 5/02* (2013.01)

(58) Field of Classification Search
USPC ......................................................... 701/532
See application file for complete search history.

(56) References Cited

U.S. PATENT DOCUMENTS 4,409,832 A * 10/1983 Konjedic ............ B60R 16/0232
340/450.3
5,423,214 A    6/1995 Lee
(Continued)

FOREIGN PATENT DOCUMENTS

| EP | 0610050 A1 | 8/1994 |
| EP | 1521066 A1 | 4/2005 |
| EP | 1722203 A2 | 11/2006 |

OTHER PUBLICATIONS

International Search Report and Written Opinion for PCT/US2016/017616 dated Jun. 6, 2016, pp. 1-47.

*Primary Examiner* — Hussein A. Elchanti
(74) *Attorney, Agent, or Firm* — Volpe and Koenig, P.C.

(57) ABSTRACT

Embodiments provide an oil pan that includes an oil pan having a reservoir configured to hold oil and defined by one or more oil pan walls and an oil pan bottom. The oil pan includes one or more capacitance sensors coupled to a portion of the oil pan walls and configured to sense a capacitance. The oil pan includes a capacitance measuring unit electrically connected to the one or more sensors via one or more conductors and configured to receive each of the sensed capacitances via the one or more conductors and determine capacitance values for each of the sensed capacitances. The oil pan also includes a processor configured to receive the capacitance values and determine the oil level in the oil pan based on the capacitance values.

20 Claims, 6 Drawing Sheets

(51) Int. Cl.
*G07C 5/02* (2006.01)
*F01M 11/00* (2006.01)
*G01F 23/26* (2006.01)

(56) References Cited

U.S. PATENT DOCUMENTS

| | | | | |
|---|---|---|---|---|
| 5,907,278 | A * | 5/1999 | Park | G01C 9/20 |
| | | | | 123/196 M |
| 6,297,733 | B1 * | 10/2001 | Park | G01F 23/266 |
| | | | | 340/450 |
| 6,617,968 | B1 * | 9/2003 | Odisho | F16N 29/00 |
| | | | | 340/438 |
| 6,761,067 | B1 | 7/2004 | Capano | |
| 8,810,260 | B1 | 8/2014 | Zhou | |
| 9,020,766 | B2 * | 4/2015 | Von Herzen | G01M 15/05 |
| | | | | 210/85 |
| 2002/0174705 | A1 * | 11/2002 | Berndorfer | G01N 33/2888 |
| | | | | 73/1.02 |
| 2002/0184062 | A1 * | 12/2002 | Diaz | G06Q 10/06 |
| | | | | 701/29.3 |
| 2005/0172712 | A1 | 8/2005 | Nyce | |
| 2006/0114007 | A1 * | 6/2006 | Cho | G01N 33/2888 |
| | | | | 324/698 |
| 2006/0176158 | A1 * | 8/2006 | Fleming | B60R 16/0232 |
| | | | | 340/425.5 |
| 2012/0046823 | A1 * | 2/2012 | Schneider | F01M 1/18 |
| | | | | 701/29.5 |
| 2013/0076787 | A1 * | 3/2013 | Mathieu | B60R 1/00 |
| | | | | 345/633 |

* cited by examiner

OIL PAN WITH INTEGRATED CAPACITIVE SENSOR FOR MEASURING OIL LEVEL

CROSS REFERENCE TO RELATED APPLICATION

This application claims the benefit of U.S. Provisional Patent Application No. 62/114,857, filed Feb. 11, 2015.

FIELD OF THE INVENTION

The present disclosure relates to motor vehicle oil pans, and in particular, to motor vehicle oil pans with an integrated capacitive sensor for measuring oil level.

BACKGROUND

Oil plays an important role in motor vehicles, providing lubrication, which may reduce wear and tear on components during operation of the motor vehicles. The oil reduces heat caused by friction when the components rub against one another during operation. When not being utilized, the oil is typically stored in an oil pan within a body of the motor vehicle. As the oil becomes depleted during operation, the oil's ability to perform effectively is degraded.

In order to ensure that there is enough oil in the oil pan to perform effectively, the oil level in the pan is monitored periodically. Conventional methods and systems for monitoring the oil in the oil pan include a removable dipstick and manually monitoring the oil level by removing the dipstick and observing the oil on the dipstick.

SUMMARY

Embodiments provide an oil pan that includes an oil pan bottom, one or more oil pan walls extending a height between the oil pan bottom and a top of the oil pan walls and a reservoir configured to hold oil. The reservoir is defined by the one or more oil pan walls and the oil pan bottom. The oil pan also includes one or more capacitance sensors. Each sensor is coupled to a portion of the one or more oil pan walls and each is configured to sense a capacitance. The oil pan further includes a processor configured to determine an oil level in the oil pan based on the sensed capacitances from each of the one or more sensors.

Embodiments provide an oil level measuring system for use with a motor vehicle. The oil level measuring system includes an oil pan having a reservoir configured to hold oil and one or more capacitance sensors. Each sensor is coupled to a portion of the oil pan and each is configured to sense a capacitance at or proximate to the portion of the oil pan. The oil pan also includes a power source, one or more conductors coupled to the one or more capacitance sensors and a capacitance measuring unit electrically connected to the one or more sensors via the one or more conductors and configured to receive each of the sensed capacitances via the one or more conductors and determine capacitance values for each of the sensed capacitances. The oil pan also includes a processor configured to receive the capacitance values and determine an oil level in the oil pan based on the capacitance values.

Embodiments provide a motor vehicle that includes a motor vehicle body and an oil level measuring system. The measuring system includes an oil pan having a reservoir configured to hold oil and one or more capacitance sensors. Each sensor is coupled to a portion of the oil pan and each is configured to sense a capacitance at or proximate to the portion of the oil pan. The measuring system also includes a power source. One or more conductors coupled to the one or more capacitance sensors and a capacitance measuring unit electrically connected to the one or more sensors via the one or more conductors and configured to receive each of the sensed capacitances via the one or more conductors and determine capacitance values for each of the sensed capacitances. The measuring system also includes a processor configured to receive the capacitance values and determine an oil level in the oil pan based on the capacitance values and a motor vehicle computer configured to provide the oil level.

BRIEF DESCRIPTION OF THE DRAWINGS

A more detailed understanding may be had from the following description, given by way of example in conjunction with the accompanying drawings wherein.

DETAILED DESCRIPTION

Embodiments include methods and systems that measure oil levels of oil containers, such as oil pans, in different types of motorized vehicles, such as automobiles (cars), trucks, buses, motorcycles, watercrafts (e.g., ships and boats) and aircrafts. For simplification of explanation, however, embodiments described herein include methods and systems that measure oil levels of oil containers in an automobile 100.

Figure 1:
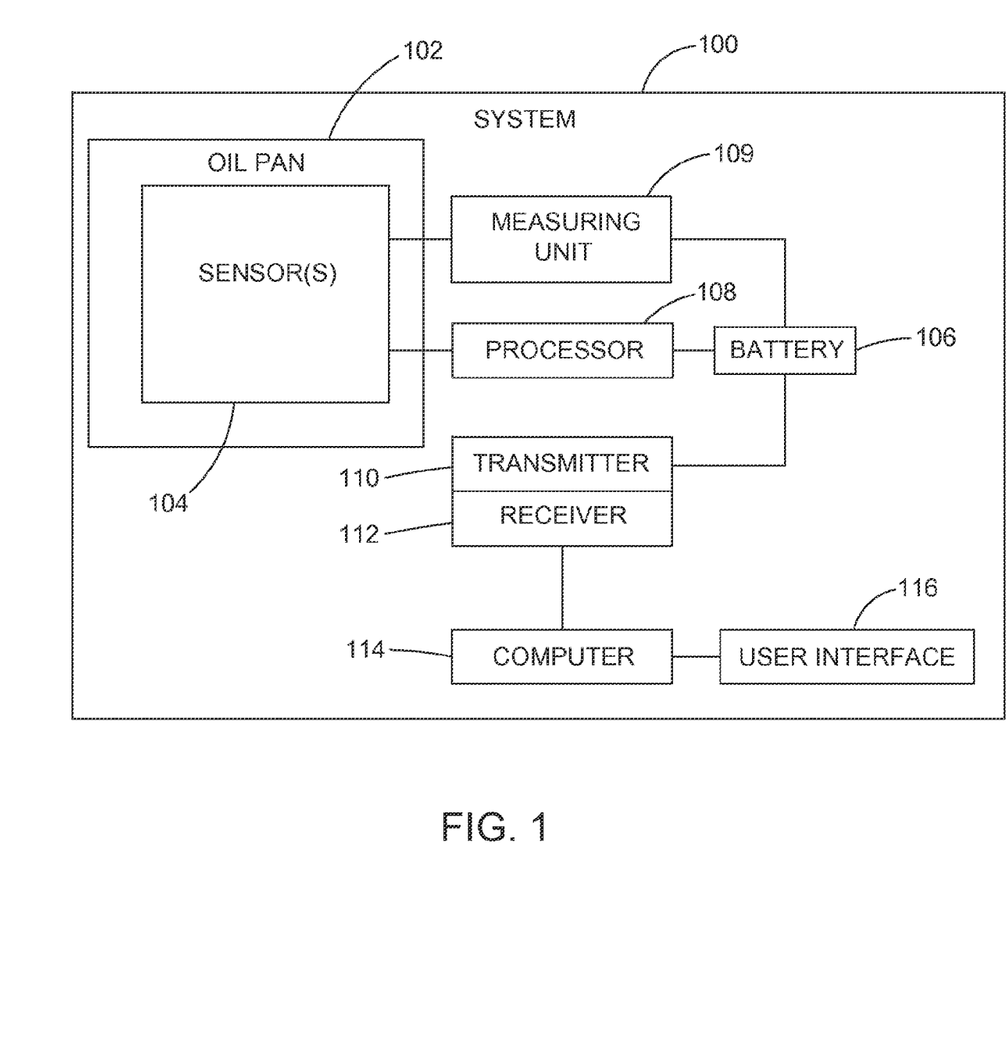
FIG. 1 is a system block diagram of an exemplary oil level measurement system according to embodiments disclosed herein.

FIG. 1 is a system diagram of an exemplary oil level measurement system 100. As shown in FIG. 1, the exemplary oil level measurement system 100 may include an oil pan 102 and one or more sensors 104. The oil pan may include a power source, such as battery 106 shown in FIG. 1. The oil pan may also include a processor 108, a capacitance measuring unit 109, a transmitter 110, a receiver 112, computer 114 and a user interface 116. In some embodiments, the transmitter 110 and receiver 112 may be integrated as a single transceiver unit. In some embodiments, the oil level measurement system 100 may not include a receiver 112 (as described in more detail below).

Many modern vehicles include computers that may monitor various aspects of vehicle performance. Some embodiments disclosed herein utilize the computers included in motor vehicles to provide the oil levels in the oil pans. For example, the computer 114 may be a motor vehicle computer, such as an automobile computer (e.g., computer in communication with different automobile systems). The computer 114 may also be separate from the automobile computer. The computer 114 may also be in communication with a motor vehicle computer.

Each of the measurement components may be part of a wired or wireless system. For example, in one embodiment, the processor 108, the computer 114, the transmitter 110 and the receiver 112 may be wired to each other. In another embodiment, the processor 108 and computer 114 may communicate wirelessly via a wireless transmitter 110 and receiver 112, such as a radio frequency (RF) transmitter and RF receiver. Information may be transmitted and received using any frequency and packet formatting from a number of different types of wireless technology standards (e.g., Industrial, Scientific and Medical (ISM) band typically used in tire pressure monitoring systems TPMS function, Bluetooth®, ANT+, and the like). The information may also be transmitted using any frequency selected by a motor vehicle manufacturer.

Figure 2:
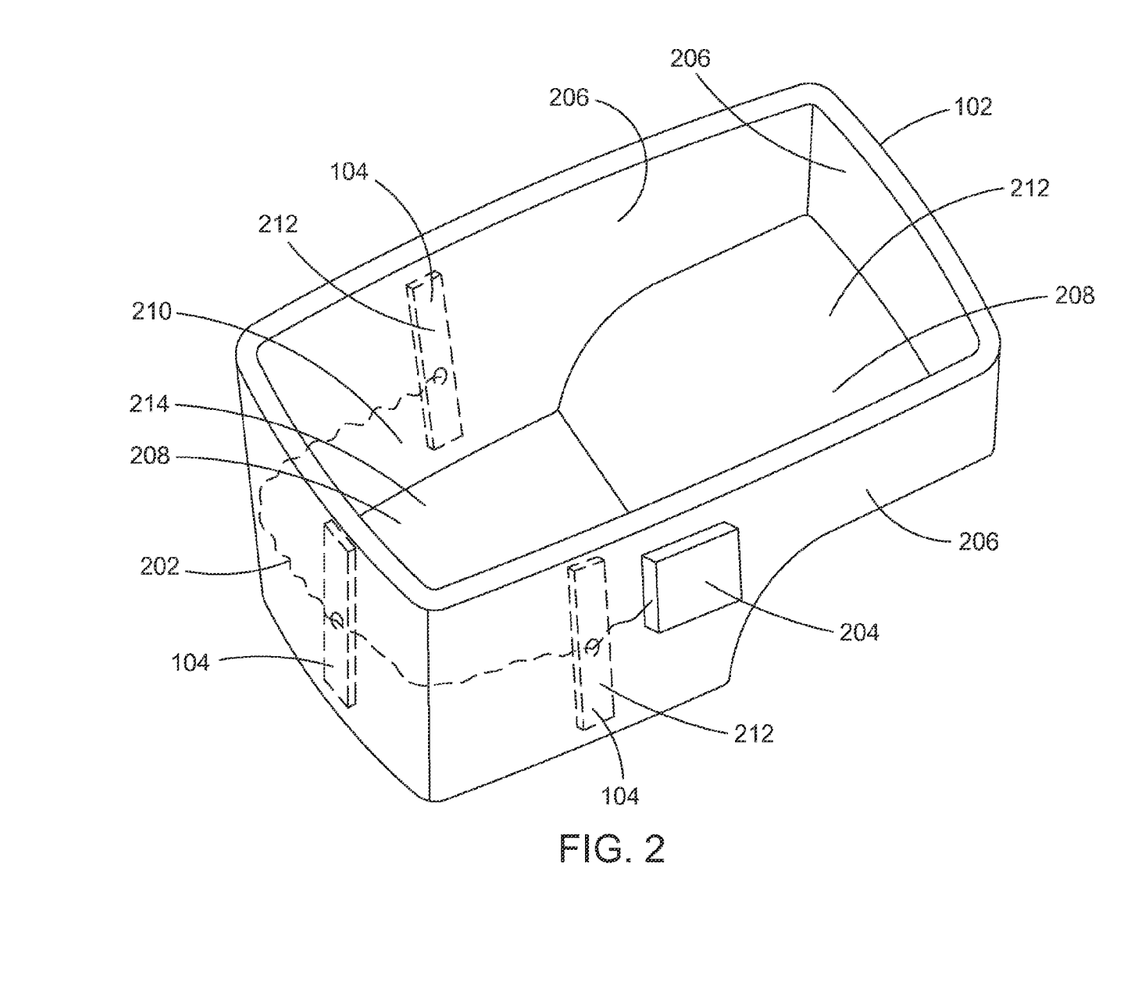
FIG. 2 is a perspective view of an exemplary automobile oil pan and oil level measuring components coupled to the oil pan for use with embodiments disclosed herein.

FIG. 2 is a perspective view of an exemplary automobile oil pan 102 and oil level measuring components coupled to the oil pan 102. As shown in FIG. 2, the components may include capacitive sensors 104, conductors (e.g., wires) 202 and electronics housing 204. The oil pan 102 includes an oil pan bottom 208, oil pan walls 206 extending a height from the oil pan bottom 208 and a reservoir 210 configured to hold oil defined by the oil pan walls 206 and oil pan bottom 208. As shown in FIG. 2, the oil can 102 may include portions of different depths. For example, the bottom 208 of the oil pan 102 extends from a shallow portion 212 to a deeper portion 214. In this embodiment, sensors 104 are disposed in the walls 206 at the deeper portion 214. In some embodiments, one or more sensors 104 may also be disposed at the shallow portion 212. Embodiments may include oil cans having any number of depth portions, including a single depth, more than two depths, and a continuously increasing depth portion (e.g., the oil can bottom has continuous slope from one end to another end).

The size and shape of the automobile oil pan 102 shown in FIG. 2 is merely exemplary. Embodiments may include oil pans shaped and sized differently than the automobile oil pan 102 shown in FIG. 2. In one embodiment, the oil pan may be circular and include a single wall. Embodiments may, however, include any number of walls. In some embodiments, the oil pan 102 may be made of a conducting material, such as metal. In other embodiments, the oil pan 102 may be made of non-conducting material such as plastic.

As shown in FIG. 2, the wires 202 and electronics housing 204 are disposed on the outside (non-oil side) of the oil pan 102 away from the heat of the oil. Electronics housing 204 may be used to house processor 108, capacitance measuring unit 109, transmitter 110 and receiver 112 (shown in FIG. 1). The power source, such as battery 106, may supply power to any of the components, such as processor 108, capacitance measuring unit 109, transmitter 110, receiver 112 and sensors 104. In some embodiments, housing 204 may house the battery 106. In other embodiments, the battery may be disposed separately from the housing 204 on the outside (non-oil side) of the oil pan 102. Disposing the electronics housing 204 and battery 106 on the outside of the oil pan and away from the heat of the oil facilitates an efficient and long-lasting system, having low maintenance that may merely include replacing the battery 106, such as after a typical batter life of 5-10 years. Both the sensors 104 and electronics (e.g., processor 108, capacitance measuring unit 109, transmitter 110, and receiver 112) may be sealed to limit or prevent contact with the oil or air to further increase the life of the system 100.

In the embodiment shown at FIG. 2, the exemplary oil level measurement system 100 includes three rectangular capacitive sensors 104 disposed within the walls 206 of the oil pan 102. The number, size, shape and location of the capacitive sensors 104 shown at FIG. 2 are merely exemplary. For example, embodiments may include oil level measurement systems having any number of capacitive sensors 104 coupled to the oil can 102, including one sensor. The capacitive sensors shown may include shapes other than rectangular. In some embodiments, sensors may be shaped differently from each other.

The capacitive sensors 104 may include one or more sensor plates 212 comprising any conductive material, such as metal. As shown in FIG. 2, the sensor plates 212 may be positioned substantially perpendicular to the oil pan bottom 208 and may be electrically connected to the capacitance measuring unit 109 (shown in FIG. 1) within electronics housing 204 using wires 202.

The sensors 104 may be coupled to the oil pan 102 in different ways. For example, the sensors 104 may be directly coupled to the oil pan 102 by contacting a portion of the oil pan 102. The sensors 104 may also be indirectly coupled to the oil pan 102 via one or more other portions, such as an insulation portion.

In some embodiments, the oil pan 102 may be made of a non-conductive material, such as plastic. When the oil pan 102 is made of non-conducting material, the sensor plates 212 may be coupled to the oil pan 102 by being disposed inside (e.g., molded within) walls 206 or disposed outside of the oil pan (non-oil side). For example, in the embodiment shown in FIG. 2, the capacitive sensors 104 are disposed within walls 206.

Figure 3:
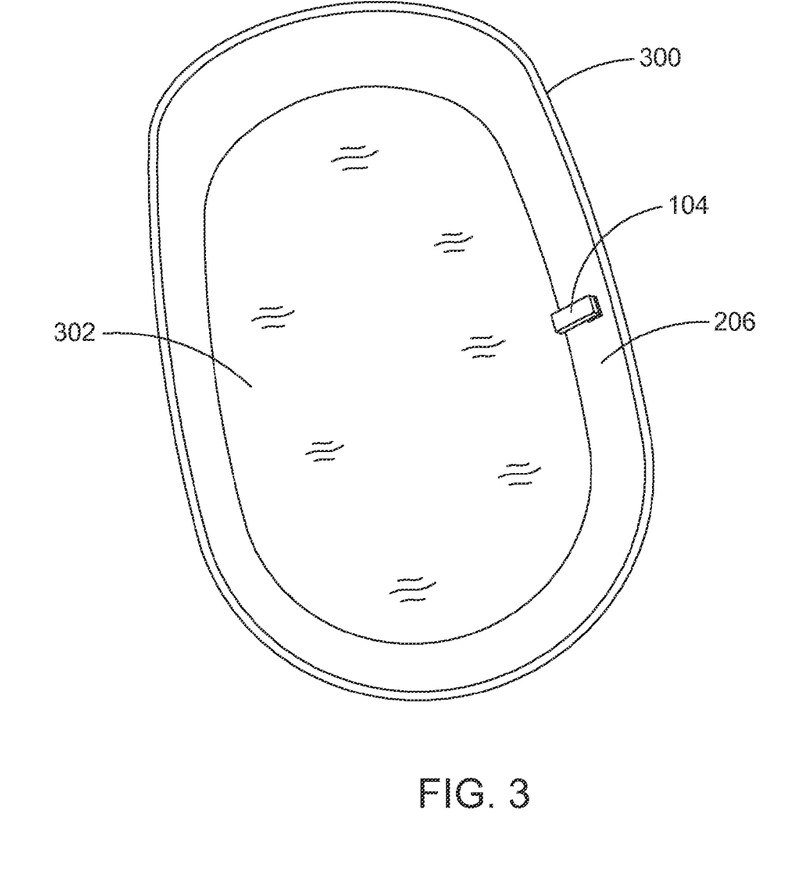
FIG. 3 is a perspective view of an oil container having a level of oil and a capacitance sensor disposed on an inside of a container wall according to an embodiment disclosed herein.
Figure 4:
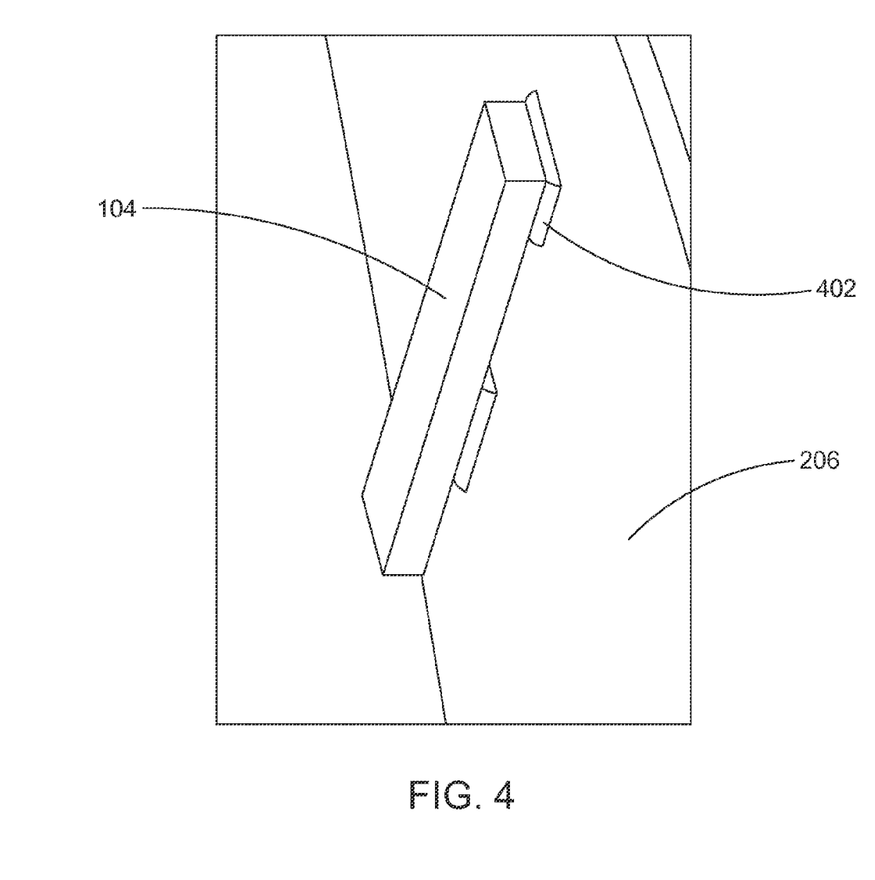
FIG. 4 is a close-up view of a capacitance sensor disposed on an inside of a container wall and insulated from the container wall according to an embodiment.

In other embodiments, the oil pan 102 may be made of a conductive material, such as metal. When the oil pan 102 is made of a conductive material, the sensor plates 212 may be disposed on the inside (oil side) of the oil pan walls 206. In the embodiments shown in FIG. 3 and FIG. 4, the oil container is made of a conductive material. FIG. 3 is a perspective view of an oil container 300 having a level of oil 302 and a capacitance sensor 104 disposed on an inside of a container wall 206 according to an embodiment. FIG. 4 is a close-up view of a capacitance sensor 104 disposed on an inside of a container wall 206 and insulated from the container wall 206 according to an embodiment. As shown in FIG. 3 and FIG. 4, the sensor plates 212 of the capacitive sensors 104 are exposed to the reservoir 210. As shown in FIG. 4, the sensor 104 is indirectly coupled to the oil pan 102 via an insulation portion 402 disposed between the container wall 206 and the sensor 104 to insulate the sensor 104 from the container wall 206. The wire (e.g., wire 202 shown in FIG. 2) may be connected to the sensor 104 on the backside (non-oil side) of the sensor 104 and may pass through the wall 206 to the capacitance measuring unit 109.

As the oil level rises within the oil pan 102, the amount of each sensor plate 212 proximate to or in contact with the oil increases. Accordingly, the capacitance across each corresponding sensor plate 212 of sensors 104 also increases. The capacitance measuring unit receives each capacitance obtained by the sensors 104 via the one or more wires 202 and determines capacitance values for each of the received capacitances. The capacitance readings are received by the measuring unit 109 via the wires 202. The capacitance measuring unit 109 may be configured to measure capacitance using different methods, including frequency tuning of an oscillator (not shown) and measurement of charge transfer onto the sensor plates 212 and off of the sensors plates 212.

The measuring unit 109 measures the capacitances and sends the measured capacitance values to the processor 108. The processor 108 receives the capacitance values determined by the capacitance measuring unit and determines the oil level in the oil pan 102 based on the received capacitance values. In some embodiments, the processor 108 may be coupled directly to the sensors 104 and may determine an oil level in the oil pan 102 based on the obtained capacitances from each of the sensors 104.

In some embodiments, the processor 108 determines an oil level value using the measured capacitance values and sends the oil level value to computer 114. In other embodiments, the processor 108 may send the capacitance values to the computer 114 and the computer 114 may determine the oil level value using the measured capacitances. The oil level may then be provided to a user (e.g., via user interface 116).

In some embodiments, such as when the oil pan 102 is made of a non-conductive material, wires 202 may be disposed in (e.g., molded inside) the oil pan walls 306. In other embodiments, such as when the oil pan 102 is made of a conductive material, wires 202 may be disposed along the outside of the walls 206. In some embodiments, the wires 202 may be contained in a metal shield (not shown). The shield may receive a signal from the capacitance measuring unit 109 that cancels the capacitance of the wires 202. The oil level may be determined based on the capacitance values received from the sensor plates without capacitance values from the wires. In some aspects, shields may be used behind the sensor plates 212 to prevent influences outside of the oil pan 102 from changing the capacitance values used to determine the oil level.

While oil pans in motor vehicles may change between level states (level with the earth) and non-level states (e.g., automobile is tilted sideways, forward or backward at an angle relative to the earth), the surfaces of oil in the oil pans remain level with the earth. When an oil pan is not level, a single sensor 104 disposed on a wall 206 of the non-level oil pan 102 may report a capacitance value that is not an accurate representation (e.g., too high or too low) of the oil level. For example, a sensor 104 may be located at a portion of the non-level oil pan 102 that is above the level of the oil while another sensor 104 may be located at an opposing portion of the non-level oil pan 102 that is below the level of the oil. Because the sensor plate 312 for each sensor 104 is independently connected to the capacitance measuring unit 109, the capacitances provided to the measuring unit 109 from each sensor 104 will be different from each other.

The oil measuring system 100 may provide accurate oil level measurements from the different capacitance values regardless of the level of the motor vehicle and the oil pan 102. For example, FIG. 2 shows three sensors 104 disposed at different locations of the oil pan 102. When the oil pan 102 is not level, the three sensors 104 may provide different sensed capacitance readings to the processor 102. The processor 102 may be configured to interpret the independent capacitance readings as coordinates in space and define the plane of the surface of the oil. The plane may be represented mathematically as an equation and the center coordinate of the oil pan 102 may be plugged into the equation and the true height of the oil may be determined. The following example is used to illustrate the determination of the oil level using three sensors 104 coupled to an oil pan having two side walls, a front wall and a back wall, a sensor 104 located in the center line of the oil pan (rear or front wall) and two other sensors 104 located on the opposing sides walls and equal distance from the center sensor 104.

The capacitance corresponding to the level of the oil in the oil pan may be given by the formula:

$$\text{ReadingC} + (\text{ReadingR} + \text{ReadingL}) * [(\text{Length of pan}) / (4 * \text{length to side sensors})]$$

where ReadingC is the center sensor reading, ReadingR is the relative reading of the right side sensor compared to the center sensor, ReadingL is the relative reading of the left side sensor compared to the center sensor, Length of pan is the length of the oil pan from front to back, and length to side sensors is the distance from the center sensor to the side sensors along the length of the oil pan (e.g., the length along the center line of the oil pan to a point in the oil pan at the intersection of a line drawn at a 90 degree angle to the side sensor). If the oil occupies part of the pan (low level), then the length of the oil pan in the formula is modified to the length that the oil occupies. If the readings from each of the three sensors are the same, then the formula simplifies to just the original reading of the center sensor (no tilt or correction). The oil level may be determined using three sensors for oil pans having different configurations. Embodiments may include any number of sensors, including less than three and more than three. The sensors may be located at any position along the oil pan.

The oil level in the oil pan 102 may be determined by the processor 108 from the capacitances sensed across each of the sensor plates 212 and measured by the capacitance measuring unit 109. The oil level in the oil pan 102 may be sent to the computer 114 and provided (visually displayed or aurally provided) to a user (e.g., via a user interface such as a driver information center) in the automobile 100. Embodiments may include, for example, providing: a numerical level of the oil; an indication that the oil level is equal to or below an oil level threshold; and/or an indication that the oil level is equal to or above an oil level threshold.

In another embodiment, the oil level may be measured and provided automatically at equal time intervals (e.g., every 24 hours) or unequal time intervals. For example, the oil measuring system 100 may automatically change periodically (e.g., every 24 hours) from a non-measuring state (e.g., powered off state, a hibernation state, or other non-measuring states) to a measuring state to measure the oil and send the oil level measurement information (e.g., via the RF transmitter 110) to the automobile's computer 114. In another embodiment, the oil level may be measured and provided automatically upon request of a user or an electronic component (e.g., automobile computer) in response to the occurrence of an event (e.g., upon start of automobile). For example, the oil measuring system 100 may, in response to receiving (e.g., via the RF receiver 112) a request for providing the oil level measurement information, measure the oil level and provide the oil level measurement information. The request may, for example, be from a component (e.g., automobile computer) of the automobile in response to the occurrence of an event, such as when the automobile 100 is turned on. For example, when the automobile 100 is turned on, the computer (e.g., computer 114) may cause (e.g., awaken, power-on, and the like) the processor 108 to provide the oil level measurement information to the computer 114. The request for providing the oil level measurement information may also be received via a user interface (e.g., a driver information center).

The oil level measurement information may correspond to an oil level measurement taken at any time the automobile 100 is at rest (e.g., engine is not on), including a time when the oil is expected to be drained back into the oil pan 102, to provide for a more accurate measurement of the oil level.

The oil level may be measured prior to the automobile 100 turning on and prior to the oil level measurement information being provided. The processor 108 may store oil level measurement information and provide the oil level measurement information when awakened (e.g., when automobile 100 is turned on). The processor 108 may also transmit the oil level measurement information to a storage unit (not shown), such as storage unit in the computer 114, prior to being awakened or requested to send the oil level measurement information. For example, processor 108 may also transmit the oil level measurement information storage unit in the computer 114 responsive to the oil level being measured.

In some embodiments, the RF receiver 112 may receive an indication to measure an oil level (e.g., when the oil level measurement is requested via the user interface or via the computer 114 upon the automobile 100 being turned on). In other embodiments, the oil measuring system 100 may not include a receiver. For example, the oil level may be measured and/or provided automatically at equal time intervals without receiving a request to provide the oil level information. The transmitter 110 and receiver 112 may be configured to send and receive information via a wired or wireless system using any of the types of wireless technology standards described above.

Figure 5:
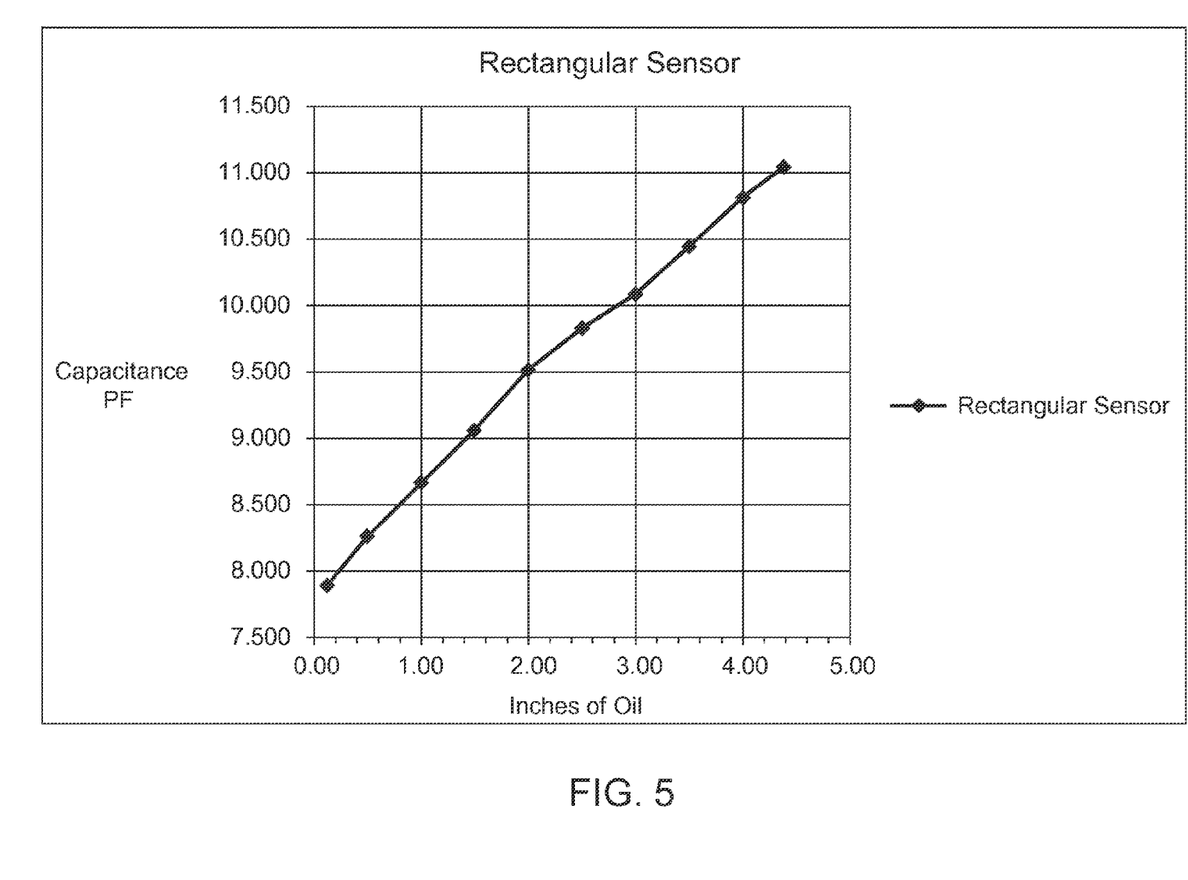
FIG. 5 is a graph illustrating the relationship between exemplary capacitance readings and the oil level in accordance with an embodiment.

FIG. 5 is a graph illustrating the relationship between exemplary capacitance readings and the oil level in accordance with an embodiment. The exemplary capacitance readings in FIG. 5 are obtained using a single rectangular sensor vertically disposed along a height of an oil pan. The oil level in FIG. 5 is measured in inches (in.) and capacitance is measured in picofarads (pf). As shown in FIG. 5, the oil level increases substantially linearly along the height of the rectangular sensor as the capacitance increases. The known relationship between exemplary capacitance readings of a sensor and the oil level of a pan facilitates the determination of the oil level in oil pan oil by an exemplary measuring system, such as system 100.

Figure 6:
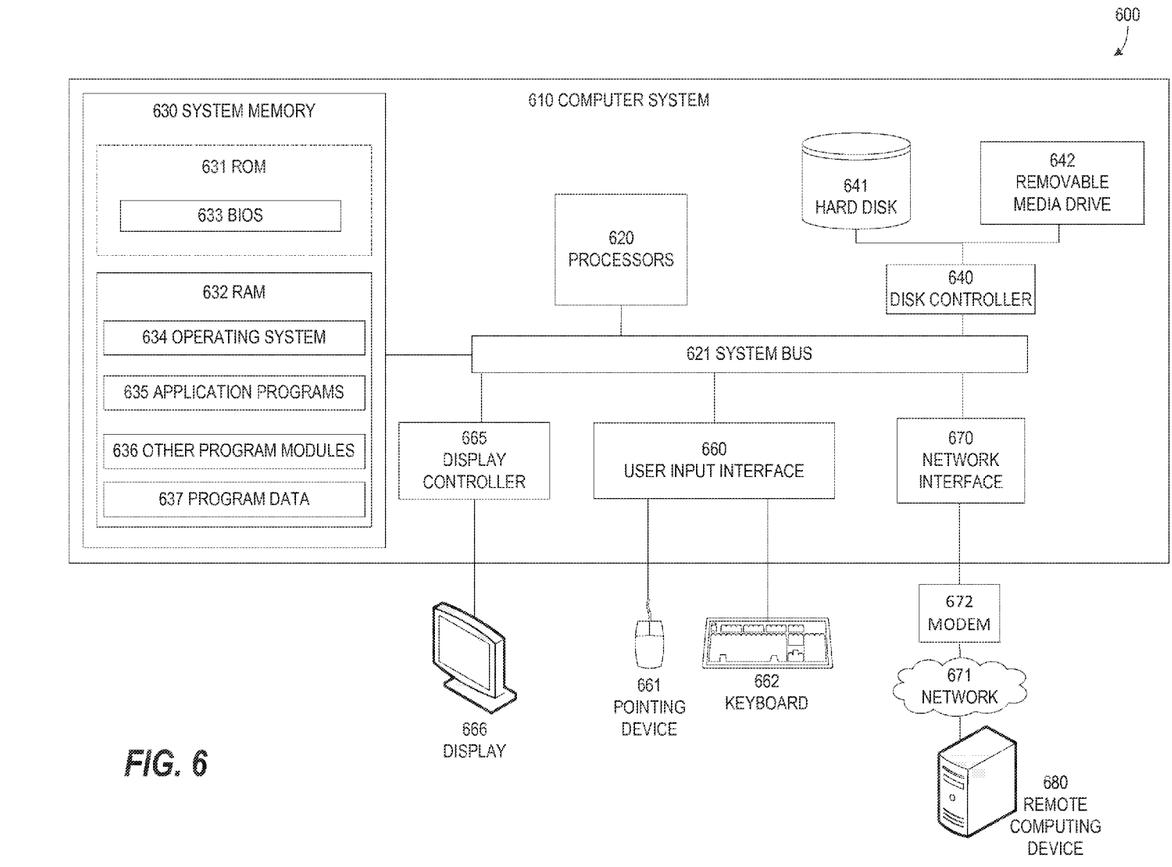
FIG. 6 illustrates an example of a computing environment within which embodiments of the invention may be implemented.

FIG. 6 illustrates an example of a computing environment 600 within which embodiments of the invention may be implemented. Computing environment 600 may be implemented as part of any component described herein. Computing environment 600 may include computer system 610, which is one example of a computing system upon which embodiments of the invention may be implemented. As shown in FIG. 6, the computer system 610 may include a communication mechanism such as a bus 621 or other communication mechanism for communicating information within the computer system 610. The system 610 further includes one or more processors 620 coupled with the bus 621 for processing the information. The processors 620 may include one or more CPUs, GPUs, or any other processor known in the art.

The computer system 610 also includes a system memory 630 coupled to the bus 621 for storing information and instructions to be executed by processors 620. The system memory 630 may include computer readable storage media in the form of volatile and/or nonvolatile memory, such as read only memory (ROM) 631 and/or random access memory (RAM) 632. The system memory RAM 632 may include other dynamic storage device(s) (e.g., dynamic RAM, static RAM, and synchronous DRAM). The system memory ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system 633 (BIOS) containing the basic routines that help to transfer information between elements within computer system 610, such as during start-up, may be stored in ROM 631. RAM 632 may contain data and/or program modules that are immediately accessible to and/or presently being operated on by the processors 620. System memory 630 may additionally include, for example, operating system 634, application programs 635, other program modules 636 and program data 637.

The computer system 610 also includes a disk controller 640 coupled to the bus 621 to control one or more storage devices for storing information and instructions, such as a magnetic hard disk 641 and a removable media drive 642 (e.g., floppy disk drive, compact disc drive, tape drive, and/or solid state drive). The storage devices may be added to the computer system 610 using an appropriate device interface (e.g., a small computer system interface (SCSI), integrated device electronics (IDE), Universal Serial Bus (USB), or FireWire).

The computer system 610 may also include a display controller 665 coupled to the bus 621 to control a display or monitor 666, such as a cathode ray tube (CRT) or liquid crystal display (LCD), for displaying information to a computer user. The computer system 610 includes a user input interface 660 and one or more input devices, such as a keyboard 662 and a pointing device 661, for interacting with a computer user and providing information to the processor 620. The pointing device 661, for example, may be a mouse, a trackball, or a pointing stick for communicating direction information and command selections to the processor 620 and for controlling cursor movement on the display 666. The display 666 may provide a touch screen interface which allows input to supplement or replace the communication of direction information and command selections by the pointing device 661.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium, such as a hard disk 641 or a removable media drive 642. The hard disk 641 may contain one or more data stores and data files used by embodiments of the present invention. Data store contents and data files may be encrypted to improve security. The processors 620 may also be employed in a multi-processing arrangement to execute the one or more sequences of instructions contained in system memory 630. In alternative embodiments, hard-wired circuitry may be used in place of or in combination with software instructions. Thus, embodiments are not limited to any specific combination of hardware circuitry and software.

As stated above, the computer system 610 may include at least one computer readable medium or memory for holding instructions programmed according to embodiments of the invention and for containing data structures, tables, records, or other data described herein. The term "computer readable medium" as used herein refers to any non-transitory, tangible medium that participates in providing instructions to the processor 620 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 641 or removable media drive 642. Non-limiting examples of volatile media include dynamic memory, such as system memory 630. Non-limiting examples of transmission media include coaxial cables, copper wire, and fiber optics, including the wires that make up the bus 621. Transmission media may also take the form of acoustic or light waves, such as those generated during radio wave and infrared data communications.

The computing environment 600 may further include the computer system 610 operating in a networked environment using logical connections to one or more remote computers, such as remote computer 680. Remote computer 680 may be a personal computer (laptop or desktop), a mobile device, a server, a router, a network PC, a peer device or other common network node, and typically includes many or all of the elements described above relative to computer 610. When used in a networking environment, computer 610 may include modem 672 for establishing communications over a network 671, such as the Internet. Modem 672 may be connected to system bus 621 via network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computing system 660). The network 671 may be wired, wireless or a combination thereof. Wired connections may be implemented using Ethernet, Universal Serial Bus (USB), RJ-11 or any other wired connection generally known in the art. Wireless connections may be implemented using Wi-Fi®, WiMAX™, and Bluetooth®, infrared, cellular networks, satellite or any other wireless connection methodology generally known in the art. Additionally, several networks may work alone or in communication with each other to facilitate communication in the network 671.

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and is conditioned using executable instructions to perform special purpose functions not performed by a general purpose computer. A processor may be coupled (electrically and/or as comprising executable components) with any other processor enabling interaction and/or communication there-between. Computer program instructions may be loaded onto a computer, including without limitation, a general purpose computer or special purpose computer, or other programmable processing apparatus to produce a machine, such that the computer program instructions which execute on the computer or other programmable processing apparatus create means for implementing the functions specified in the block(s) of the flowchart(s). A user interface processor or generator is a known element comprising electronic circuitry or software or a combination of both for generating display elements or portions thereof. A user interface (UI) comprises one or more display elements enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A graphical user interface (GUI), as used herein, comprises one or more display elements, generated by a display processor and enabling user interaction with a processor or other device and associated data acquisition and processing functions.

The UI also includes an executable procedure or executable application. The executable procedure or executable application conditions the display processor to generate signals representing the UI display images. These signals are supplied to a display device which displays the elements for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display elements in response to signals received from the input devices. In this way, the user interacts with the display elements using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

A workflow processor, as used herein, processes data to determine tasks to add to, or remove from, a task list or modifies tasks incorporated on, or for incorporation on, a task list, as for example specified in a program(s). A task list is a list of tasks for performance by a worker, user of a device, or device or a combination of both. A workflow processor may or may not employ a workflow engine. A workflow engine, as used herein, is a processor executing in response to predetermined process definitions that implement processes responsive to events and event associated data. The workflow engine implements processes in sequence and/or concurrently, responsive to event associated data to determine tasks for performance by a device and or worker and for updating task lists of a device and a worker to include determined tasks. A process definition is definable by a user and comprises a sequence of process steps including one or more, of start, wait, decision and task allocation steps for performance by a device and or worker, for example. An event is an occurrence affecting operation of a process implemented using a process definition. The workflow engine includes a process definition function that allows users to define a process that is to be followed and may include an event monitor. A processor in the workflow engine tracks which processes are running, for which patients, physicians, and what step needs to be executed next, according to a process definition and may include a procedure for notifying physicians of a task to be performed.

The system and processes of the figures presented herein are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. Further, the processes and applications may, in alternative embodiments, be located on one or more (e.g., distributed) processing devices on a network linking the units of FIG. 6. Any of the functions and steps provided in the Figures may be implemented in hardware, software or a combination of both. No claim element herein is to be construed under the provisions of 35 USC 112, sixth paragraph, unless the element is expressly recited using the phrase "means for."

Although features and elements are described above in particular combinations, one of ordinary skill in the art will appreciate that each feature or element can be used alone or in any combination with the other features and elements.

What is claimed is:

1. An oil pan comprising:
   an oil pan bottom;
   one or more oil pan walls extending a height between the oil pan bottom and a top of the oil pan walls;
   a reservoir configured to hold oil, the reservoir defined by the one or more oil pan walls and the oil pan bottom;
   three or more capacitance sensors, each capacitance sensor coupled to a portion of the one or more oil pan walls and each configured to sense a capacitance; and
   a processor configured to determine an oil level in the oil pan based on sensed capacitances from each of the three or more capacitance sensors, wherein the processor is further configured to:
   interpret the sensed capacitances from each of the three or more capacitance sensors as coordinates in space;
   define a plane of a surface of the oil; and
   determine the oil level based on the coordinates, the plane defined by the processor, and a center coordinate of the oil pan.

2. The oil pan of claim 1, further comprising:
   a power source;
   three or more conductors coupled to the three or more capacitance sensors; and
   a capacitance measuring unit electrically connected to the three or more capacitance sensors via the three or more conductors and configured to receive each of the sensed capacitances via the three or more conductors and determine capacitance values for each of the sensed capacitances,
   wherein the processor is configured to receive the capacitance values and determine the oil level in the oil pan based on the capacitance values.

3. The oil pan of claim 1, further comprising:
   a transmitter configured to transmit an oil level value, corresponding to the oil level determined by the processor, to a computer to provide the oil level to a user.

4. The oil pan of claim 3, further comprising a receiver configured to receive a request from the computer to provide the oil level.

5. The oil pan of claim 4, wherein the transmitter and receiver are configured to communicate wirelessly.

6. The oil pan of claim 4, wherein the receiver is configured to receive a request for the oil level and the processor is configured to automatically provide the oil level upon receiving the request.

7. The oil pan of claim 1, wherein the processor is configured to automatically provide the oil level at equal time intervals.

8. The oil pan of claim 1, further comprising a storage unit, wherein the processor is further configured to store the oil level value in the storage unit.

9. The oil pan of claim 1, wherein the one or more oil pan walls are non-conductive and the three or more capacitance sensors are at least one of: disposed inside the one or more oil pan walls and disposed outside of the oil pan walls.

10. The oil pan of claim 1, wherein the one or more oil pan walls are conductive and the three or more capacitance sensors are disposed on the inside of the one or more oil pan walls.

11. The oil pan of claim 2, further comprising a shield configured to house the three or more conductors, wherein the shield is configured to receive a signal from the capacitance measuring unit that cancels the capacitance of the three or more conductors and the capacitance measuring unit is configured to determine the capacitance values for each of the sensed capacitances without interference from capacitance of the three or more conductors.

12. The oil pan of claim 1, wherein,
   the oil pan comprises two side walls, a front wall and a back wall,
   the three or more capacitance sensors includes a first sensor located in a center line of the oil pan, a second sensor and a third sensor located on opposing side walls, and
   the processor is further configured to determine the oil level based on:
   the sensed capacitances from the first sensor, the second sensor and the third sensor;
   a length of the oil pan from the front wall to the back wall; and
   an equidistant length extending from the second sensor to the first sensor along the length of the oil pan and extending from the third sensor to the first sensor along the length of the oil pan.

13. An oil level measuring system for use with a motor vehicle, the oil level measuring system comprising:
   an oil pan having a reservoir configured to hold oil;
   three or more capacitance sensors, each capacitance sensor coupled to a portion of the oil pan and each configured to sense a capacitance at or proximate to the portion of the oil pan;
   a power source;
   three or more conductors coupled to the three or more capacitance sensors;
   a capacitance measuring unit electrically connected to the three or more capacitance sensors via the three or more conductors and configured to receive each of the sensed capacitances via the three or more conductors and determine capacitance values for each of the sensed capacitances;
   a processor configured to receive the capacitance values and determine an oil level in the oil pan based on the capacitance values, wherein the processor is further configured to:
   interpret the sensed capacitances from each of the three or more capacitance sensors as coordinates in space;
   define a plane of a surface of the oil; and
   determine the oil level based on the coordinates, the plane defined by the processor, and a center coordinate of the oil pan.

14. The measuring system of claim 13, further comprising:
- a motor vehicle computer configured to provide the oil level determined by the processor to a user; and
- a transmitter configured to transmit an oil level value, corresponding to the oil level determined by the processor, to the motor vehicle computer.

15. The measuring system of claim 14, further comprising a receiver configured to receive a request from the motor vehicle computer to provide the oil level.

16. The measuring system of claim 15, wherein the transmitter and receiver are configured to communicate wirelessly.

17. The measuring system of claim 15, wherein the receiver is configured to receive a request from the motor vehicle computer in response to an occurrence of an event for the oil level and the processor is configured to automatically provide the oil level upon receiving the request from the motor vehicle computer in response to an occurrence event for the oil level.

18. The oil pan of claim 15, further comprising a user interface configured to receive the request to provide the oil level,
wherein the receiver is configured to receive the request and the processor is configured to automatically provide the oil level in response to the request.

19. A motor vehicle comprising:
a motor vehicle body; and
an oil level measuring system comprising:
an oil pan having a reservoir configured to hold oil;
three or more capacitance sensors, each capacitance sensor coupled to a portion of the oil pan and each configured to sense a capacitance at or proximate to the portion of the oil pan;
a power source;
three or more conductors coupled to the three or more capacitance sensors, wherein the three or more capacitance sensors includes a first sensor located in a center line of the oil pan, a second sensor and a third sensor located on opposing side walls;
a capacitance measuring unit electrically connected to the three or more capacitance sensors via the three or more conductors and configured to receive each of the sensed capacitances via the three or more conductors and determine capacitance values for each of the sensed capacitances;
a processor configured to receive the capacitance values and determine an oil level in the oil pan based on the capacitance values, wherein the processor is further configured to:
interpret the sensed capacitances from each of the three or more capacitance sensors as coordinates in space;
define a plane of a surface of the oil; and
determine the oil level based on the coordinates, the plane defined by the processor, and a center coordinate of the oil pan, wherein
the processor is further configured to determine the oil level based on:
the sensed capacitances from the first sensor, the second sensor and the third sensor:
a length of the oil pan from a front wall to a back wall; and
an equidistant length extending from the second sensor to the first sensor along the length of the oil pan and extending from the third sensor to the first sensor along the length of the oil pan; and
a motor vehicle computer configured to provide the oil level.

20. The oil pan of claim 13, wherein,
the oil pan comprises two side walls, a front wall and a back wall,
the three or more capacitance sensors includes a first sensor located in a center line of the oil pan, a second sensor and a third sensor located on opposing side walls, and
the processor is further configured to determine the oil level based on:
the sensed capacitances from the first sensor, the second sensor and the third sensor;
a length of the oil pan from the front wall to the back wall; and
an equidistant length extending from the second sensor to the first sensor along the length of the oil pan and extending from the third sensor to the first sensor along the length of the oil pan.

* * * * *